United States Patent
Yu et al.

(10) Patent No.: US 11,584,231 B2
(45) Date of Patent: Feb. 21, 2023

(54) HEADS-UP DISPLAY DEVICE, DRIVING METHOD, VEHICLE AND ELECTRONIC APPARATUS

(71) Applicant: BOE TECHNOLOGY GROUP CO., LTD., Beijing (CN)

(72) Inventors: Yue Yu, Beijing (CN); Zhusong Yi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 326 days.

(21) Appl. No.: 16/961,682

(22) PCT Filed: Dec. 2, 2019

(86) PCT No.: PCT/CN2019/122432
§ 371 (c)(1),
(2) Date: Jul. 11, 2020

(87) PCT Pub. No.: WO2020/140664
PCT Pub. Date: Jul. 9, 2020

(65) Prior Publication Data
US 2021/0107357 A1   Apr. 15, 2021

(30) Foreign Application Priority Data
Jan. 3, 2019   (CN) .......................... 201910003763.4

(51) Int. Cl.
*B60K 35/00*   (2006.01)
*G02B 27/01*   (2006.01)

(52) U.S. Cl.
CPC .......... *B60K 35/00* (2013.01); *G02B 27/0101* (2013.01); *G02B 27/0179* (2013.01);
(Continued)

(58) Field of Classification Search
CPC ............ G02B 27/0179; G02B 27/0101; G02B 2027/0138; G02B 2027/014;
(Continued)

(56) References Cited

U.S. PATENT DOCUMENTS 11,187,793 B1 *  11/2021  Liu ....................... G05D 1/0088
2015/0005983 A1 *  1/2015  Hiroki ....................... G06N 5/02
701/1

(Continued)

FOREIGN PATENT DOCUMENTS

CN      106314282 A      1/2017
CN      108139583 A      6/2018
(Continued)

OTHER PUBLICATIONS

CN Third Office Action in Application No. 201910003763.4, dated Feb. 2, 2021.
(Continued)

*Primary Examiner* — Christopher E Leiby
(74) *Attorney, Agent, or Firm* — Syncoda LLC; Feng Ma

(57) ABSTRACT

A heads-up display device for a vehicle includes: a display component; a controller; and an execution component; wherein: the display component is configured to output a heads-up display image; the controller is configured to acquire a real-time vehicle speed of the vehicle, and generate an image distance control signal associated with the real-time vehicle speed of the vehicle; and the execution component is connected to the display component, and the execution component is configured to adjust a focal point of the display component according to the image distance control signal, and control an image distance of the heads-up display image displayed by the display component thus adjusting the focal point of the display component according to the change of the real-time vehicle speed.

14 Claims, 8 Drawing Sheets

(52) U.S. Cl.
CPC .. *B60K 2370/1529* (2019.05); *B60K 2370/50* (2019.05); *G02B 2027/014* (2013.01); *G02B 2027/0138* (2013.01); *G02B 2027/0183* (2013.01)

(58) Field of Classification Search
CPC ............ G02B 2027/0183; B60K 35/00; B60K 2370/50; B60K 2370/167; B60K 2370/1529
See application file for complete search history.

(56) References Cited

U.S. PATENT DOCUMENTS

| | | | |
|---|---|---|---|
| 2016/0203660 A1* | 7/2016 | Chowdhury | B60W 40/107 701/33.4 |
| 2016/0299234 A1* | 10/2016 | Zeng | G01S 19/52 |
| 2017/0169612 A1* | 6/2017 | Cashen | G06T 19/006 |
| 2019/0086661 A1* | 3/2019 | Misawa | B60K 35/00 |
| 2019/0230328 A1* | 7/2019 | Oshima | B60K 35/00 |
| 2019/0235290 A1* | 8/2019 | Nakayama | G02B 27/0149 |

FOREIGN PATENT DOCUMENTS

| | | |
|---|---|---|
| CN | 108459415 A | 8/2018 |
| CN | 108873367 A | 11/2018 |
| JP | H06115381 A | 4/1994 |
| TW | 201831948 A | 9/2018 |

OTHER PUBLICATIONS

CN First Office Action in Application No. 201910003763.4, dated Feb. 21, 2020.
International Search Report in Application No. PCT/CN2019/122432, dated Mar. 2, 2020.

* cited by examiner

HEADS-UP DISPLAY DEVICE, DRIVING METHOD, VEHICLE AND ELECTRONIC APPARATUS

CROSS-REFERENCE TO RELATED APPLICATIONS

The present application is a national stage of International Application No. PCT/CN2019/122432 filed on Dec. 2, 2019, which claims priority to Chinese Patent Application No. 201910003763.4 filed on Jan. 3, 2019. The disclosures of these applications are hereby incorporated by reference in their entirety.

FIELD

The present disclosure relates generally to the field of display technologies, and more specifically to a heads-up display device, a method of driving a heads-up display device, a vehicle equipped with the heads-up display, and an electronic device capable of providing the heads-up display and employing the method of driving thereof.

BACKGROUND

Heads-Up or Head-Up Displays (HUD) have gradually gained wide application in gaming applications and have recently been transitioning into the real-world automotive field. A heads-up display typically refers to a transparent or miniaturized display technology which can be displayed in the user's natural frame of view and which does not require users to shift their gaze from where they are naturally looking wherein the information can be semi-transparent, or miniature yet displayed in the easy peripheral viewing area.

SUMMARY

In an aspect, a heads-up display device for a vehicle is provided, including:
a display component;
a controller; and
an execution component;
wherein:
the display component is configured to output a heads-up display image;
the controller is configured to acquire a real-time vehicle speed of the vehicle, and generate an image distance control signal associated with the real-time vehicle speed of the vehicle; and
the execution component is connected to the display component, and the execution component is configured to adjust a focal point of the display component according to the image distance control signal, and control an image distance of the heads-up display image displayed by the display component thus adjusting the focal point of the display component according to the change of the real-time vehicle speed.

In some embodiments:
the controller is further configured to generate an angle control signal according to a real-time vehicle speed of the vehicle; and
the execution component is further configured to drive the display component to adjust a top view angle of an image displayed by the display component according to the angle control signal.

In some embodiments, the controller is configured to determine an approximate vehicle speed of the real-time vehicle speed according to the real-time vehicle speed and generate an image distance control signal according to the approximate vehicle speed.

In some embodiments:
the controller is configured to determine an approximate vehicle speed of the real-time vehicle speed according to the real-time vehicle speed; and
the controller is configured to generate an angle control signal according to the approximate vehicle speed.

In some embodiments:
the controller further includes a storage module;
the storage module is configured to store a preset plurality of vehicle speed intervals, each interval corresponding to a different preset approximation, wherein the plurality of vehicle speed intervals are consecutive multiple vehicle speed intervals; and
the controller is configured to determine which of the plurality of vehicle speed ranges in which the acquired real-time vehicle speed is located, and use a preset approximate value corresponding to the vehicle speed interval in which the current real-time vehicle speed is located as the approximate vehicle speed of the real-time vehicle speed.

In some embodiments:
the display component includes an image source having an adjustable position;
the controller is further configured to calculate an expected displacement of the image source according to the approximate vehicle speed, and generate an image distance control signal according to the expected displacement; and
wherein the execution component includes a first actuator coupled to the positionally adjustable image source;
the first actuator is configured to control the image source to move at least in a first direction in accordance with an image distance control signal generated by the controller; and
the first direction is a light exiting direction of the image source.

In some embodiments:
the plurality of the vehicle speed intervals has a fixed quantification interval; and wherein the controller determines an expected displacement of the image source by using a first algorithm;
the first algorithm includes:

$$L_e = \begin{cases} \frac{Va}{\Delta V} \times k + L_0, & \frac{Va}{\Delta V} < \theta \\ \left[\theta + \frac{Va - \theta \cdot \Delta V}{\Delta V} \times \log_{2\Delta V}(Va - \theta \cdot \Delta V)\right] \times k + L_0, & \frac{Va}{\Delta V} \geq \theta \end{cases};$$

and
Le is the expected displacement of the image source, k is the conversion coefficient, $\Delta V$ is the fixed quantification interval of the current vehicle speed V, $\theta$ is the quantized speed threshold, and L0 is the initial displacement.

In some embodiments, the execution component is further configured to:
drive the display component according to the angle control signal; and
control the distance between an image displayed by the component and the plane that the vehicle is located to be at the preset distance.

In some embodiments, the display component includes:
an optical module configured to receive the lights from an image source and emit an image;
wherein:

the optical module includes a first mirror that is rotatable about an axis;

the controller is further configured to calculate an expected rotation angle of the first mirror according to the real-time vehicle speed, and generate an angle control signal according to the expected rotation angle; and the execution component includes a second drive assembly coupled to the first mirror, which configured to control the rotation of the first mirror by the angle control signal generated by the controller.

In some embodiments, a relative distance between a natural gaze focal point of a driver and the HUD focal point have a customizable rate of convergence or divergence, the customizable rate of convergence or divergence being dependent in part on the actual velocity of the vehicle.

In another aspect, a driving method for a heads-up display (HUD) device is provided, including:

displaying a HUD display image;

determining a real-time speed of the vehicle; and generating an image distance control signal according to a real-time speed of the vehicle such that an image distance of an image displayed by the heads-up display device changes according to a change in the real-time vehicle speed;

adjusting a focal point of the HUD display image according to the image distance control signal according to the change of the real-time vehicle speed.

In some embodiments, the driving method further includes:

generating an angle control signal based on the real-time vehicle speed of the vehicle so as to adjust a top view angle of the HUD display image being displayed by the heads-up display device.

In some embodiments, the driving method further includes:

generating an image distance control signal according to the real-time speed of the vehicle based on:

determining an approximate vehicle speed of the real-time speed according to a real-time speed interval range; and generating an image distance control signal based on the approximate vehicle speed.

In some embodiments, the generating an angle control signal according to the real-time vehicle speed of the vehicle further includes:

determining an approximate vehicle speed of the real-time speed according to the real-time speed; and generating an angle control signal based on the approximate vehicle speed.

In some embodiments:

the interval of the preset plurality of vehicle speed ranges in which the real-time vehicle speed is located is determined;

an approximate vehicle speed of the real-time vehicle speed is determined by using the preset approximate value corresponding to the vehicle speed interval in which the real-time vehicle speed is located; and the plurality of vehicle speed ranges is composed of continuous multiple speed intervals.

In another aspect, a vehicle including the heads-up display device is provided.

In another aspect, an electronic device is provided, including:

one or more processors; and a non-transitory computer-readable medium being configured to store thereon computer-executable instructions, the computer-executable instructions containing information to instruct the one or more processors to perform the method.

In another aspect, a heads-up display device for a vehicle is provided, including:

a display component;

a controller; and an execution component;

wherein:

the display component is configured to output a heads-up display image;

the controller is configured to acquire a real-time vehicle speed of the vehicle, and generate an image distance control signal associated with the real-time vehicle speed of the vehicle;

the execution component is connected to the display component;

the execution component is configured to adjust a focal point of the display component according to the image distance control signal, and control an image distance of the heads-up display image displayed by the display component thus adjusting the focal point of the display component according to the change of the real-time vehicle speed;

the controller is further configured to generate an angle control signal according to a real-time vehicle speed of the vehicle;

the execution component is further configured to drive the display component to adjust a top view angle of an image displayed by the display component according to the angle control signal;

the controller is configured to determine an approximate vehicle speed of the real-time vehicle speed according to the real-time vehicle speed and generate an image distance control signal according to the approximate vehicle speed;

the controller is further configured to generate an angle control signal according to the approximate vehicle speed; and the execution component is further configured to drive the display component according to the angle control signal, and to control the distance between an image displayed by the component and the plane that the vehicle is located to be at the preset distance.

In some embodiments:

the controller further includes a storage module;

the storage module is configured to store a preset plurality of vehicle speed intervals, each interval corresponding to a different preset approximation;

the plurality of vehicle speed intervals are consecutive multiple vehicle speed intervals; and the controller is configured to determine which of the plurality of vehicle speed ranges in which the acquired real-time vehicle speed is located, and use a preset approximate value corresponding to the vehicle speed interval in which the current real-time vehicle speed is located as the approximate vehicle speed of the real-time vehicle speed.

In some embodiments:

the display component includes an image source having an adjustable position, and wherein the controller is further configured to calculate an expected displacement of the image source according to the approximate vehicle speed, and generate an image distance control signal according to the expected displacement;

the execution component includes a first actuator coupled to the positionally adjustable image source;

the first actuator is configured to control the image source to move at least in a first direction in accordance with an image distance control signal generated by the controller; and the first direction is a light exiting direction of the image source.

In some embodiments:

the plurality of the vehicle speed intervals has a fixed quantification interval;

the controller determines an expected displacement of the image source by using a first algorithm including:

$$L_e = \begin{cases} \dfrac{Va}{\Delta V} \times k + L_0, & \dfrac{Va}{\Delta V} < \theta \\ \left[\theta + \dfrac{Va - \theta \cdot \Delta V}{\Delta V} \times \log_{2\Delta V}(Va - \theta \cdot \Delta V)\right] \times k + L_0, & \dfrac{Va}{\Delta V} \geq \theta \end{cases};$$

and Le is the expected displacement of the image source, k is the conversion coefficient, ΔV is the fixed quantification interval of the current vehicle speed V, θ is the quantized speed threshold, and L0 is the initial displacement.

In some embodiments, a relative distance between a natural gaze focal point of a driver and the HUD focal point have a customizable rate of convergence or divergence, the customizable rate of convergence or divergence being dependent in part on the actual velocity of the vehicle.

It is to be understood that the above general descriptions and the detailed descriptions below are only exemplary and explanatory, and are not intended to limit the present disclosure.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based these drawings.

DETAILED DESCRIPTION

Figure 1:
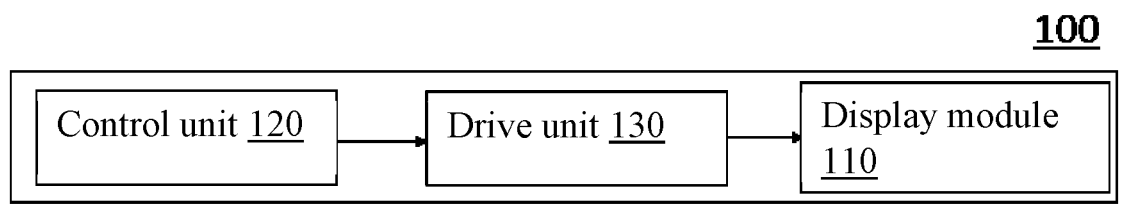
FIG. 1 illustrates an exemplary block diagram of a heads-up display system according to one or more embodiments of the present disclosure.

The embodiments set forth below represent the necessary information to enable those of ordinary skill in the art to practice the embodiments and illustrate the best mode of practicing the embodiments. Upon reading the following description in light of the accompanying drawing figures, those of ordinary skill in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present.

In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "horizontal" or "horizontal" can be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

HUDs have been previously used as a heads-up display technology for aircraft. In recent years, with the development of vehicle-assisted driving technology, HUD technology has begun to be applied to automobiles.

The heads-up display can thus allow a user to easily view important information displayed by the instrument clusters during the driving process (such as speed, navigation, etc.) wherein in some instances the HUD can be projected onto the front windshield, so that the driver can see the information in the instrument cluster without looking down, which can not only help the new drivers that are lack of experience in speed judgment to control the speeds of their vehicles, to avoid speeding in the speed limit section of the roads, but also more importantly, enable the driver to instantaneously read under the condition that the large field of view does not shift, and always maintain the driver at the best observation state by avoiding situations in which the driver might be required to look down at the instrument cluster or audio displays wherein an accident may be caused due to the reduced reaction time caused by the distraction or temporary loss of focus and thus prevent the driver from taking effective measures if there is an emergency in front of the vehicle.

The existing vehicle HUD technology generally displays vehicle information (including vehicle speed, oil quantity, etc.) on an LCD display screen with LED as a backlight, and uses the screen as an image source to project the image source through a series of optical operations using optical devices. The desired projection is reflected on the front windshield and reflected to the human eye from the front windshield. The resulting effect is a holographic image that the driver perceives in a manner such that the vehicle information appears to be floating just above the hood, a few meters away from the driver.

When the speed of the vehicle increases, the focus of the human eye moves forward and upward. At this time, if the driver wants to view the HUD information projected in front of the car, it is necessary to switch the focus of the focus staying at a higher position to the HUD virtual image, i.e. between the near and lower positions and higher or more distantly forward focal point.

It will then be understood that the farther the distances between the two positions are, or in other words, the larger the up and down distance is, the stronger the discomfort to the driver when the focus needs to switch between the HUD and the driving focal point. Additionally, the larger this distance the longer it takes for the driver to switch between focal points to gain information from the HUD and the longer the driver will be unfocused on the actual driving. This not only affects the driver's driving experience, but also reduces driving safety.

The inventors of the present disclosure have recognized that although the existing heads-up display system can project an image that can be displayed onto the front windshield, the distance of the virtual image presented by the existing heads-up display system from the driver's eye is fixed, and it cannot be automatically adjusted at different speeds which may lead to safety hazards associated with the growing distance between a focal point of driving and the point of display of the HUD.

In order to enable those of ordinary skill in the art to better understand the technical solutions of the present disclosure, the heads-up display device and display method provided by the present disclosure will be described in detail below with reference to the accompanying drawings.

Various embodiments of the disclosure can achieve the technical effects of adjusting the HUD imaging distance and the imaging height according to the current traveling speed of the vehicle through a method and system for vehicle-mounted HUD imaging position adaptation, thereby solving the problem that the existing HUD technologies failure to adjust to changes in the driver's gaze focus when the vehicle speed changes. The problem being that the driver's driving experience is deteriorated and the driving safety is lowered due to the inability of such systems to adjusting the HUD imaging position and maintain a relative focal point distance between the HUD and the gaze focus.

In some embodiments, not only is the distance adjusted, the overall HUD solution can be expanded, for example the angle of view or field of view can be adjusted.

As the vehicle speed increases, the driver's realization angle is actually slowly increased. In fact, the HUD's angle of view is lower than the driver's perspective. At this time, the driver's driving line of sight angle changes, and the HUD's angle of view changes. It should also be appreciated that in response to this need the system can then adjust the realization angle as well as the height of the displayed HUD in order to maintain an optimal comfort level and relative angular distance between the HUD focal point and the gaze focal point.

Various embodiments of the present disclosure provide a heads-up display device in which an image distance changes in accordance with a change in vehicle speed and can be adapted to a human eye gaze distance.

In some embodiments, and as shown in FIG. 1, an exemplary embodiment here shows a simplified block diagram of a heads-up display device 100 of an embodiment of the present disclosure. Specifically, the head up display device comprises: a display component 110, a controller 120 and an execution component 130.

The display unit 110 is configured to display an image, and the controller 120 is configured to acquire a real-time speed of the vehicle and generate and output an image associated with the HUD, for example, a distance control signal according to the real-time speed of the vehicle; the executing unit 130 is connected to the display component 110 and the controller 120.

The executing unit 130 can then be configured to drive the display component 110 according to the image distance control signal generated by the controller 120, and to control the image distance of the image displayed by the display component 110 to change according to the change of the real-time vehicle speed.

In some related existing systems, when the vehicle is in a running state, the display assembly of the heads-up display device is used to project an image containing driving information which can then be perceived by the driver, so that the driver observes a virtual image containing driving information located in front of the vehicle.

The driving information includes vehicle status information such as vehicle speed, oil temperature and water temperature. In addition, the driving information can also include indication information such as vehicle exterior objects and navigational information.

The heads-up display device as contemplated herein can include a particular image distance, which is the distance between the virtual image displayed by the display component and focal point of the driver's eyes when properly focused on the road at a given speed.

This distance can also be expressed as a relative angle between from the user's eyes between the HUD focal point and the natural driving focal point. When the driver drives the vehicle, the focus of the driver's gaze changes with the change of the speed of the vehicle.

For example, in the case of a faster vehicle speed, the focus of the driver's gaze will be farther ahead of the vehicle than that when the vehicle speed is slow which again can be expressed as an upward angular rotation at high speeds as compared to low speeds.

However, the image distances of the existing heads-up display devices are all either displayed directly onto the windshield or holographic projections provided having fixed image distances, generally in the range of 2 to 15 meters, wherein the prior-art image distance is not adjustable, which causes the mismatch between the focus distance of the driver's eyes and the image distance of the heads-up display devices at different vehicle speeds.

For example, under normal driving conditions, the driver will typically look at the road ahead. However, when the driver needs to be apprised of some of the information displayed by the HUD, the focus of the driver's eyes needs to be switched from the road condition to the image displayed by the HUD. This action is optimally performed in the quickest amount of time possible.

In the case of too fast or too slow vehicle speed, when the focus of the driver's gaze is switched from the front road condition to the virtual image displayed by the heads-up display device, is the position of the HUD can be adjusted as necessary so as to require the minimum change in focus of the eye to a large extent or cause the driver to glance or re-focus in the least possible relative distance.

It will then be understood that when focus adjustment time is long or the associated glancing distance is large, often leads to a safety hazard as will be associated with the increased distraction or readjustment times which will have an associated increase in required reaction times to changing road conditions.

In a first embodiment of the heads-up display device provided by the present disclosure, as compared with the prior art, when the vehicle is traveling at different speeds, the controller adjusts the image focal distance or position of the HUD according to the traveling speed of the vehicle, so that the image distance of the HUD is adapted to the different focal lengths of the driver's gaze so as to minimize refocus requirements and glancing distances so as to minimize time required to gain information from the HUD and thus avoid safety hazards.

In the first embodiment of the present disclosure, the controller 120 can further generate an angle control signal according to the real-time speed of the vehicle. The executing unit 130 can then further drive the display component according to the angle control signal and adjust a top view angle of an image displayed by the display component.

The image displayed by the heads-up display device is generally disposed below the gaze direction of the driver during normal driving. The angular difference generally has a certain angle (0°-20°) with the gaze direction of the driver.

When the driver views the HUD image, there is a certain angle between the line of sight and the horizontal direction, i.e. top view angle. If only the image distance of the HUD is adjusted and the top view angle of the image displayed by the HUD is not adjusted, then there is a large distance in the perceived vertical direction or relative height between the gaze direction during normal driving and the image of the HUD.

In such instances, the driver can then have difficulty naturally viewing the image displayed by the HUD.

For example, when the image distance of the HUD is large, and if the top view angle of the HUD does not change, the driver will see that the image of the HUD is very close to the ground in front of where the vehicle is located, and even observe that the image enter below the ground, which will cause the driver not be able to observe the HUD image normally.

In the present embodiment, the controller 120 adjusts the image distance and the image top view angle, i.e. the relative angle between the view angle of natural driving and the HUD display angle, simultaneously to enable the driver to view the HUD display in a proper position in the vertical direction in relation to where the driver is naturally looking.

Specifically, the execution component 130 can control a distance between an image displayed by the display component and a plane where the vehicle is located to be a preset distance according to the angle control signal output by the controller 120.

In order to prevent the HUD image from being close to the ground on which the vehicle is traveling or prevent the illusion that the driver generates HUD images below the ground, the controller can control the relative angle of the HUD image to always maintain the appearance of the HUD projection to maintain a certain distance from the ground. For example, the distance set by the driver or the HUD device can be provided at a predetermined value upon being shipped from the factory.

The user can then be prompted to set a profile wherein a custom distance or desired angular offset can then be customized by the user. In some embodiments, the system can be adjusted to have several pre-set profiles based on a particular eye height and seat positions relating to distance from the windshield.

As such, when the vehicle is traveling at different speeds, the controller 20 controls the distance between the image of the HUD and the location of the vehicle to be customized to each driver of the car such that the relative HUD location is always constant with respect to the particular user's height, eye location, relative speed, etc. For example, the driver can be provided having a preset distance, so that the image distance of the HUD is constantly adjusted while the HUD image can still be observed naturally by the driver.

It will then be appreciated that different users or drivers can have different driving characteristics with regard to where a particular user looks given a particular speed. For example, some drivers might look less or farther into the distance at different rates given particular speed increases. As such, the relative angle difference between the HUD and the natural gaze location can have a customizable variable rate as it relates to the automatic adjustment of the system with regard to vehicle speed.

Specifically, in accordance with some embodiments, the display component 110 can include an image source, which can be a stereoscopic display image source or a non-stereoscopic display image source, wherein the particular type of display may be any known display or projection method as will be readily understood by those having skill in the art, wherein the particular examples discussed herein are given by way of example only and are thus not intended to limit the scope of the present disclosure.

When the image source is a non-stereoscopic display image source, the display component 110 can further include an optical module. The image source can then be configured to generate light containing driving information, and the optical module can then be configured to display the image or the light containing the driving information so that the driver can observe a virtual image located in front of the driving position of the vehicle.

For example, the optical module can include optical elements such as lenses and mirrors wherein the lenses and mirrors can have variable curvatures or positions which allow for the appropriate relocation or refocusing so as to maintain the desired location of the HUD display with regard to the natural gaze or focal point of the driver.

When the image source is a non-stereoscopic display component, the execution component 130 can be a mechanical drive structure. In some such embodiments, an electric motor, or a plurality thereof, can be provided in desired locations required for adjusting the position of the image source and the optical components included in the optical module to change the image distance and the top view angle of the heads-up display device.

It will be appreciated by those of ordinary skill in the art, and being in possession of this disclosure, that the manner of adjusting the HUD image distance can be implemented in any one of various methods.

For example, the position of the image source relative to the optical module can be adjusted, and the image distance can be changed by adjusting the position of the image source. The optical module can in some associated instances, include a lens with adjustable power, wherein changing the power of the lens can be utilized so as to change the image distance. Other methods of implementing the adjustment the image distance are also contemplated herein however, the various particular methods are given by way of example, and are not intended to specifically limit the present application.

In addition, those of ordinary skill in the art will appreciate that there are various ways to realize the adjustment of the viewing angle of the HUD image. For example, when the optical module includes a mirror, the angle of the mirror can be adjusted to adjust the top view angle of the image, or the relative position of the image source wherein the optical module can then be adjusted to alter the top view angle as desired. Similarly, the method for adjusting the top view angle is not specifically limited to the examples as provided herein.

In addition, when the image source is a stereoscopic image source, for example, a stereoscopic image source based on binocular parallax, or a light field display device, the heads-up display device can omit an optical module. As will be appreciated by those having skill in the art, the image source can be placed directly on the windshield of the vehicle or combined with an optical module to create a virtual image.

When the image source is a stereoscopic image source, the execution component 130 can include an image rendering unit for rendering image information of different depths of field, and the image source is displayed according to the rendered image information generated by the execution component 130, so that the driver can observe images with different perceived image distances.

Specifically, the controller 120 can be a microcomputer composed of a known CPU, a ROM, a RAM, a nonvolatile memory element (for example, an EEPROM), a memory, an I/O, and a bus connecting them, which can then be coupled to, either wirelessly or hard wired to the vehicle speed sensor or the like, such that the controller 120 can acquire information such as the vehicle's speed, and generate a control signal for changing the image position displayed by the HUD based on the vehicle speed.

The controller can also be configured by one or more ICs or the like in hardware to perform part or all of the functions of the controller.

In some embodiments, the heads-up display device in the first embodiment of the present disclosure can include a speed sensor for measuring the vehicle speed in real-time, utilizing ultrasonic, infrared, or other sensors so as to independently determine speed.

Alternatively, a satellite-based navigational system such as the global positioning system (GPS), or other location determining mechanisms can also be utilized in place of a more typical vehicle speed sensor. In some embodiments, and for purposes of discussing exemplary features in a simple setting, the controller can obtain the real-time speed of the vehicle directly from the driving computer of the vehicle or from the speed sensor of the vehicle itself.

The following is a detailed description of the controller 120 in the embodiment of the present disclosure. The controller 120 is specifically configured to acquire the approximate vehicle speed (Va) of the real-time vehicle speed V according to the acquired real-time vehicle speed as detected by the vehicle. Based on the approximate vehicle speed, the controller can be utilized to generate an optimal image distance control signal and an optimal angle control signal.

Figure 2:
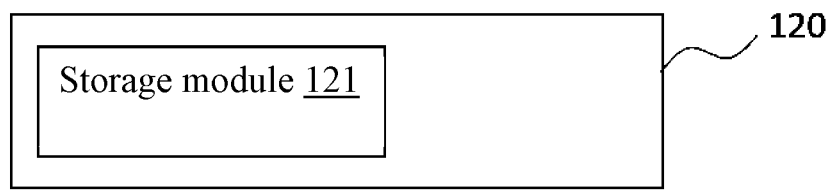
FIG. 2 illustrates an exemplary block diagram of a controller employed in one or more embodiments of the present disclosure.

Further, as shown in FIG. 2, the controller 120 includes a storage module such as a memory device 121.

The storage module 121 can be configured to store a preset plurality of consecutive vehicle speed intervals, each interval corresponding to a different preset approximations of an optimal HUD display distance and relative display angle based on the driver's eye location, both depth and height from the windshield, wherein for a plurality of potential user profiles each of the plurality of vehicle speed intervals include one or more consecutive multiple vehicle speed intervals and associated HUD display parameters.

The controller 120 can then be configured to determine a vehicle speed interval in which the real-time vehicle speed is located, and determine a preset approximation corresponding to the vehicle speed interval in which the real-time vehicle speed is located is used as the approximate vehicle speed Va of the real-time vehicle speed V.

During the actual running of the vehicle, the actual vehicle speed of the vehicle will change frequently, and the real-time vehicle speed V obtained in real-time is approximated, and the vehicle speed in a certain vehicle speed interval [Vmin, Vmax] is approximated.

For example, in some embodiments given a range of detected variations in speed, the speed can be approximated to Vmin, so as to avoid frequent changes in the virtual image distance of the HUD. In other words, the system can granularly adjust the HUD display in pre-set intervals rather than continuously adjust the HUD display in a smooth linear fashion so as to improve the driving experience of the driver.

This interval method can then help reduce the amount of calculations of the system, thus saving cost and power consumption. When the real-time vehicle speed V is approximated, the vehicle speed maximum value Vmax, as well as the average value Vave, and the like, of a certain vehicle speed interval can be approximated as the vehicle speed Va, which is not intended to limit the scope of the present disclosure.

Figure 3:
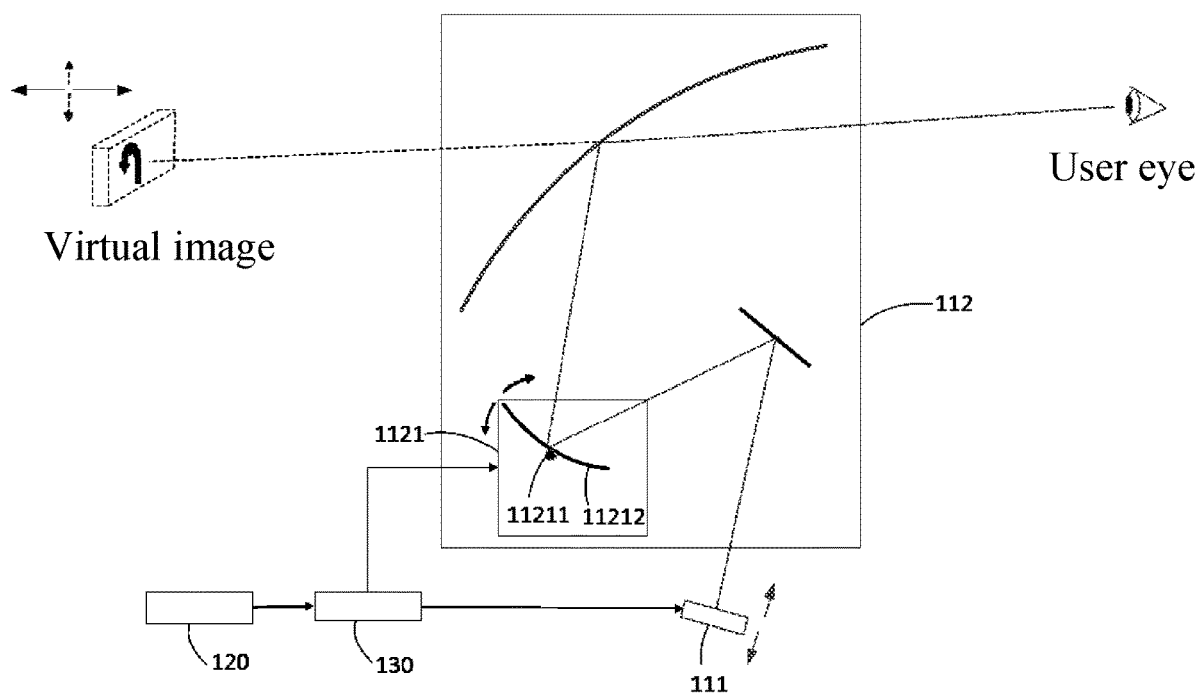
FIG. 3 illustrates a structural diagram of a display assembly used in one or more embodiments of the present disclosure.

As an exemplary illustration, as shown in FIG. 3, in this embodiment, the display component 110 of the heads-up display device can include an image source 111 and an optical module 112.

The image source 111 in this embodiment can be configured to generate light signal, the light signal including image information, wherein the optical module 112 can be configured to receive the light emitted by the image source 111 and produce a display image utilizing the light signal.

For example, the image source 111 can be a transmissive liquid crystal display module including a backlight, or can be provided as a reflective LCoS (silicon-based liquid crystal) based reflective display module, or can be a display module based on a DLP (Digital Light Processing) chip or a laser MEMS, These being merely examples of potential implementations which are not intended to limit the scope of the present disclosure as contained herein. specifically, in some embodiments, the image source 111 can be a positionally adjustable image source.

In this embodiment, the controller 120 can be specifically configured to calculate an expected displacement Le of the image source according to the approximate vehicle speed Va, and generate an image distance control signal according to the expected displacement Le. In such an embodiment the expected displacement Le can be a displacement relative to an initial position of the image source or a relative distance to the driver's gaze focal point and the focal point of the HUD display.

In another aspect of the present disclosure, and as shown in FIG. 3, an embodiment is illustrated in which the execution component 130 can include a first actuator connected to the image source 111. In these embodiments, the first actuator can be configured to control the image source 111 to at least move the expected displacement Le along a first direction according to an image distance control signal issued by the controller. In this manner, the image distance of the heads-up display can be changed so as to correlate with changes of the vehicle's speed.

In this embodiment, the image source 111 can include a light emitting surface, wherein the image light is emitted from the light emitting surface, and wherein the first direction is a light emitting direction of the image source 111.

Specifically, the controller 120 can be utilized to determine the approximate vehicle speed Va of the real-time vehicle speed currently acquired at a fixed quantified interval. In other words, a plurality of uniform vehicle speed intervals can be divided by a fixed quantification interval $\Delta V$, and the difference between the maximum vehicle speed and the minimum vehicle speed in each quantification interval is $\Delta V$. The size of the quantification interval $\Delta V$ can be determined according to actual needs.

After the controller 120 obtains the approximate vehicle speed Va, the expected displacement Le of the display component is obtained according to the first algorithm; the first algorithm can include:

$$L_e = \begin{cases} \frac{Va}{\Delta V} \times k + L_0, & \frac{Va}{\Delta V} < \theta \\ \left[\theta + \frac{Va - \theta \cdot \Delta V}{\Delta V} \times \log_{2\Delta V}(Va - \theta \cdot \Delta V)\right] \times k + L_0, & \frac{Va}{\Delta V} \geq \theta \end{cases}$$

In this equation, Le is the expected displacement, k is the conversion coefficient, Va is the approximate vehicle speed of the current real-time vehicle speed V, $\Delta V$ is the interval quantification interval, $\theta$ is the quantized speed threshold, L0 is the initial displacement; the initial displacement L0 can be set according to actual needs. It generally can be set to 0; when the current vehicle speed is 0 km/h, the expected displacement is equal to the initial displacement, and when the current vehicle speed is not 0 km/h, the controller 120 can determine the expected displacement according to the first algorithm.

In the case that the approximate vehicle speeds Va and $\Delta V$ are less than a predetermined speed threshold, according to the first algorithm, the expected displacement of the image source of the heads-up display device can be linearly related to speed. However, in some embodiments a non-linear relationship can also be correlated between speed and the expected displacement. For example, the driver may not look much farther into the distance at varying higher speeds as compared to a similar change in speed at lower speeds.

In some instances, considering that the vehicle interior space is limited, when the approximate vehicle speeds Va and $\Delta V$ are greater than or equal to the speed threshold, the expected displacement of the image source of the heads-up display device can thus be logarithmically related to speed.

In some embodiments, in this embodiment, and as shown in FIG. 3, the optical module 112 can include a first mirror 1121 that is rotatable about an axis.

As shown in FIG. 3, the controller 120 can be utilized to calculate an expected rotation angle $\theta$ of the first mirror 121 based on the approximate vehicle speed Va, and generate an angle control signal according to the expected rotation angle $\theta$.

In some such embodiments, the execution component 130 can include a second actuator which can be connected to the first mirror 1121. The second actuator can then be configured to control the rotation of the first mirror 121 according to an angle control signal sent by the controller 120, wherein the angle control signal can include information regarding the particular degree to which to adjust a top view angle of the image. For example, the distance between the image displayed by the display component and the plane of the vehicle is kept at a preset distance.

In some such embodiments, the first mirror 1121 can include a first mirror body 11211 and a first fixed axis 11212, wherein the first mirror body 11211 can be configured to be rotatable about a first fixed axis 11212. In some such situations, the extending direction of the first fixed axis 11212 can be provided as a second direction being parallel to the width direction of the vehicle and perpendicular to the longitudinal direction of the vehicle, i.e. the forward motion direction of the vehicle.

In some embodiments, the heads-up display device can include multiple working modes. For example, such modes can include options regarding an automatic adjustment mode and a normal mode.

When the display device is in the automatic adjustment mode, the heads-up display device can adjust the image distance and top view angle of the HUD image in a preset manner according to the method as outlined above.

Alternatively, when in the normal mode, the image distance and the top view angle of the heads-up display system can remain static or unchanged. In such embodiments, the driver can select between the automatic mode or the normal mode.

In yet additional embodiments, and as briefly discussed above, the vehicle can include a user or driver database which can allow for the various users or drivers to save a customizable profile which can allow the user to set varying rates with regard to the relative distances between gaze focal points and HUD focal points as well as set customized variable relative positions and relative change rates with respect to the vehicle speed.

The driver's preferences can then be customized so as to provide maximum personal comfort. These driver preferences relating to one or more variable rates or parameters describing the relationship between the HUD focal point and the drivers natural gaze focal point.

The driver preferences then being saved within the driver database and associated with a particular user or driver profiles. In other words, a relative distance between a natural gaze focal point of a driver and the HUD focal point can have a customizable rate of convergence or divergence, the customizable rate of convergence or divergence being dependent in part on the actual velocity of the vehicle.

It will then be understood that the vehicle can in some instances automatically load a particular user profile based on a recognition of a particular driver. This can be achieved by registering a particular user's key, FOB, etc. Alternatively, the vehicle can in some instances be provided with sensors or cameras which can be utilized to independently recognize user's based on facial recognition or logging, biometric parameters, etc.

In yet additional embodiments, the system can be provided with one or more cameras which can determine user eye location and thus optimize relative focal point locations based on determined eye locations. In some such embodiments, the cameras can also be utilized to track a driver's eye movement and continuously adjust HUD focal point location based on where the driver is looking in real-time.

In addition, the heads-up display device in the first embodiment of the present disclosure can further include an interaction module for the driver or other user to interact with the heads-up display device, such as a mode for the driver to switch the heads-up display device, or for the driver to manually adjust the image distance of the HUD, etc. In such embodiments, the interaction module can include a display screen with a touch function, a voice capture device, or a human body gesture collection device, etc.

Additionally, the heads-up display device in this embodiment can further include a mechanical button or the like to receive the user's manipulation information so as to allow the driver to manually adjust the image distance and top view angle of the heads-up display device.

Figure 4:
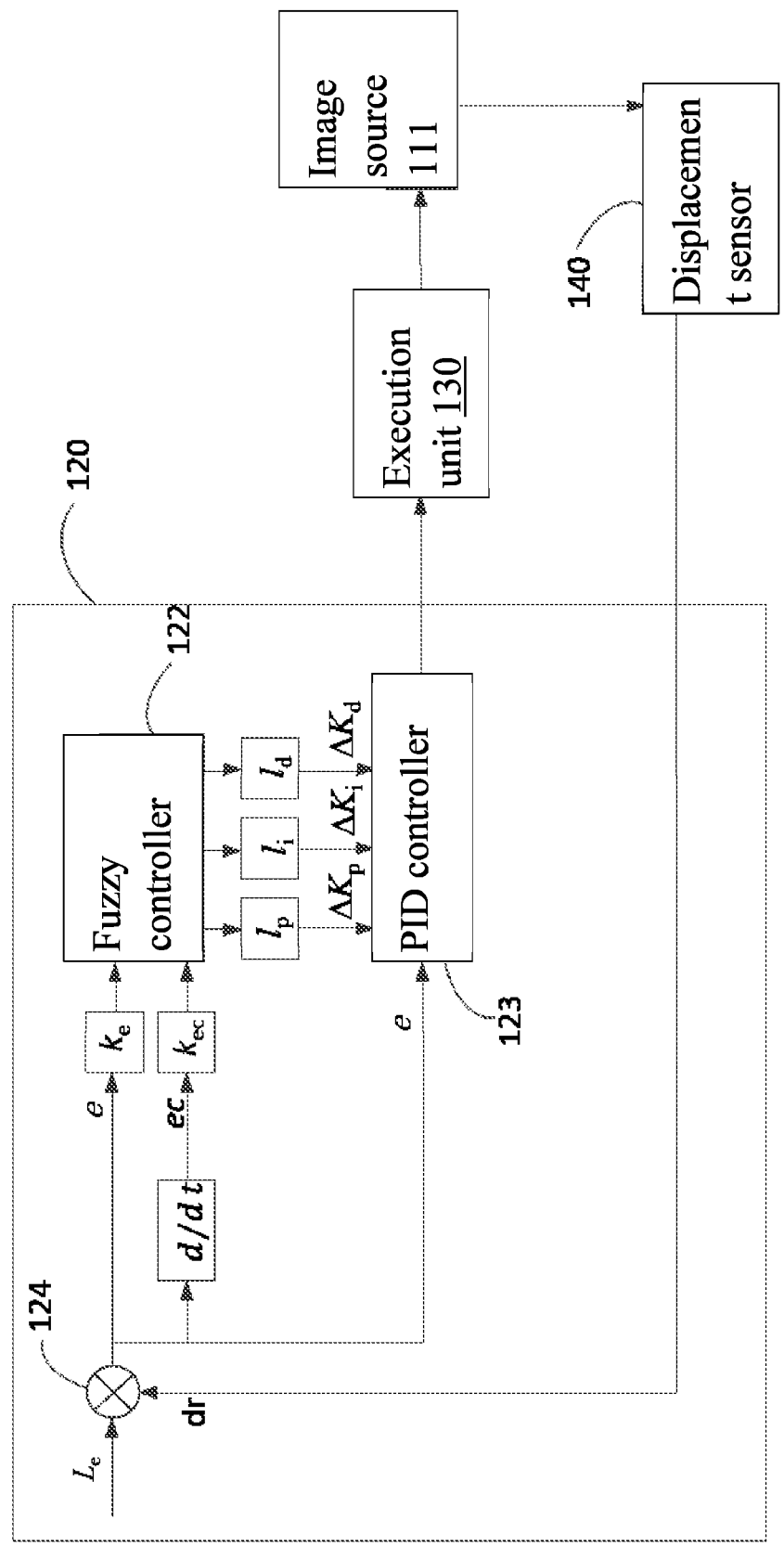
FIG. 4 illustrates an exemplary block diagram of a controller and an execution component employed in some embodiments of the present disclosure.

The following describes the image control signal and the angle control information generated by the controller, as shown in FIG. 4. As illustrated here the controller 120 can include a fuzzy PID controller, which is shown for exemplary purposes here as a fuzzy controller 122, a PID controller 123, and a calculator 124. The heads-up display device of the example can further include a displacement sensor 140 for acquiring the actual displacement (dr) of the image source.

The various device components, circuits, modules, units, blocks, or portions may have modular configurations, or are composed of discrete components, but nonetheless may be referred to as "modules" in general. In other words, the "components," "circuits," "modules," "units," "blocks," or "portions" referred to herein may or may not be in modular forms.

The calculator 124 can then be configured to receive the actual displacement (dr) of the image source determined by the displacement sensor 140 in real-time, and to calculate the deviation e of the actual displacement dr of the image source from the expected displacement of the image source, and the displacement deviation change rate ec(d/dt), and output the quantification factor ke of the deviation e and the quantification factor kec of the displacement deviation change rate ec.

The fuzzy controller 122 as shown here can be configured to receive the displacement deviation e and the displacement deviation change rate ec output by the calculator 124, and output the online adjustment amounts $\Delta K_p$, $\Delta K_i$, $\Delta K_d$ of the three parameters Kp, Ki, Kd of the PID controller 123.

The PID controller 123 can then be configured to receive the online adjustment quantities $\Delta K_p$, $\Delta K_i$, $\Delta K_d$ of the three parameters Kp, Ki, Kd output by the fuzzy controller, and determine real-time control parameters according to the second algorithm, wherein the second algorithm is:

$$\begin{cases} K_p = K_{p0} + \Delta K_p \\ K_i = K_{i0} + \Delta K_i \\ K_d = K_{d0} + \Delta K_d \end{cases},$$

Among them, Kp0, Ki0, and Kd0 are initial PID control parameters, and the initial parameters of the PID controller are set by a critical proportional method.

After the timely adjustment of the control parameters is completed, the PID controller 123 can acquire the displacement deviation e output by the calculator 124, and output the image distance control signal for controlling the action of the execution component so as to change the displacement of the HUD image source.

Specifically, as shown in FIG. 4, lp, li, and ld are scale factors of $\Delta K_p$, $\Delta K_i$ and $\Delta K_d$, respectively, for matching the basic domain and the fuzzy domain. The basic domain of displacement deviation e and deviation change rate ec can be selected as [−6,6], [−1,1], and the basic domain of output three online adjustments can be selected as [−1,1], [−0.01, 0.01], [−2,2], wherein the fuzzy domain of each input and output can then be selected as [−3,3], and the input and output fuzzy domain can be divided by a plurality of fuzzy subsets, for example 7 fuzzy subsets.

Figure 5:
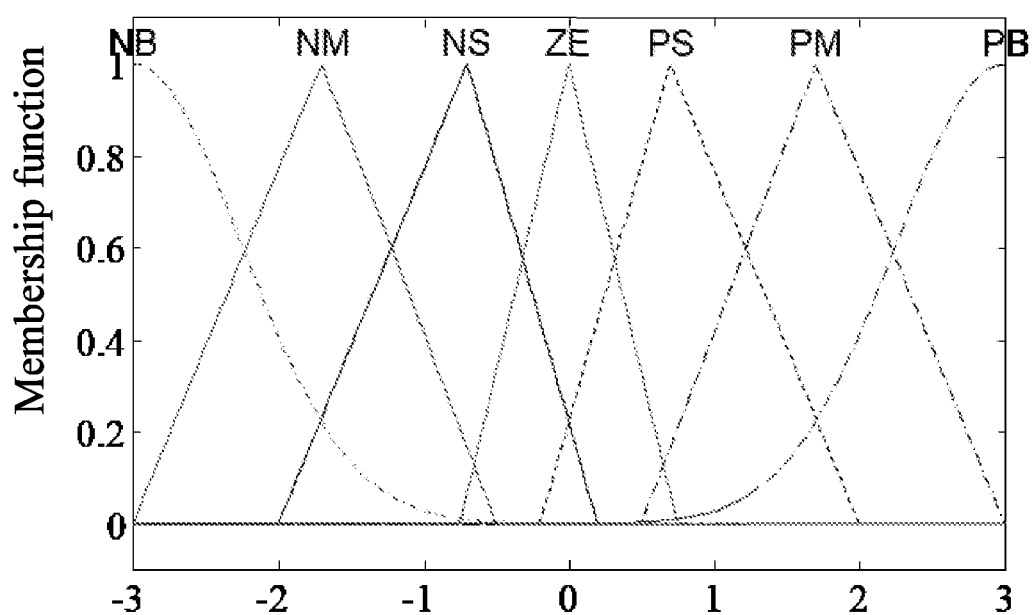
FIG. 5 illustrates a membership function curve used in some embodiments of the present disclosure.

Membership function of triangular and Gaussian types can then be used, and the fuzzy linguistic values corresponding to the fuzzy subset can be {NB (negative large), NM (negative medium), NS (negative small), ZE (zero), PS (positive small), PM (median)), PB (honest)}, the membership function curve of the input-output fuzzy domain is shown in FIG. 5.

In some particularly advantageous embodiments, the characteristics of the HUD image source displacement control system and the PID parameter adjustment principle can be obtained as follows:

When e is large, Kp can be appropriately increased to ensure a certain response speed. In this case Kd can then be increased to avoid overshoot, and Ki can then be decreased to reduce integral saturation. When ec is medium, Kp can instead be reduced to reduce overshoot, while Ki can then be increased in order to enhance system stability, and Kd can be set to a moderate value in order to ensure response speed.

When e is small, Kp can be reduced in order to ensure system stability, and Ki can then be appropriately increased in order to improve the system steady-state accuracy. To avoid oscillation, when ec is large, Kd can be decreased, and when ec is small, Kd can be increased.

According to the above experience, the fuzzy control rules of $\Delta K_p$, $\Delta K_i$, and $\Delta K_d$ are shown in Table 1.

TABLE 1

Fuzzy control rules

| | | | | EC | | | |
|---|---|---|---|---|---|---|---|
| E | NB | NM | NS | ZE | PS | PM | PB |
| NB | PB/NB/PS | PM/NB/NS | PM/NM/NB | PM/NM/NB | PS/NS/NB | ZE/ZE/NM | ZE/ZE/PS |
| NM | PM/NB/PS | PM/NB/NS | PM/NM/NB | PS/NS/NM | PS/NS/NM | ZE/ZE/NS | NS/ZE/ZE |
| NS | PM/NB/ZE | PM/NM/NS | PM/NS/NM | PS/NS/NM | ZE/ZE/NS | NS/PS/NS | NS/PS/ZE |
| ZE | PM/NM/ZE | PM/NM/NS | PS/NS/NS | ZE/ZE/NS | NS/PS/NS | NM/PM/NS | NM/PM/ZE |
| PS | PS/NM/ZE | PS/NS/ZE | ZE/ZE/ZE | NS/PS/ZE | NS/PS/ZE | NM/PM/ZE | NM/PB/ZE |
| PM | PS/ZE/PB | ZE/ZE/PS | NS/PS/PS | NM/PS/PS | NM/PM/PS | NM/PB/PS | NM/PB/PS |
| PB | ZE/ZE/PB | ZE/ZE/PM | NM/PS/PM | NM/PM/PM | NM/PM/PS | NM/PB/PS | NB/PB/PB |

Wherein E and EC are the fuzzy language variables corresponding respectively to the displacement deviation e and displacement deviation change rate ec In this situation, a Mamdani algorithm can be used for fuzzy reasoning. This particular reasoning algorithm is simple, practical and feasible, and has been successfully applied to industrial control many times in alternative situations. Using the center of gravity method for clarity, the method can be reasonable and intuitive, and can better reflect the information contained in the fuzzy set.

The PID controller 123 can then be utilized to receive one or more of the online adjustment quantities, for example, $\Delta K_p$, $\Delta K_i$, $\Delta K_d$ of the three parameters $K_p$, $K_i$, $K_d$ output by the fuzzy controller, and determine real-time control parameters according to the second algorithm, wherein the second algorithm is:

$$\begin{cases} K_p = K_{p0} + \Delta K_p \\ K_i = K_{i0} + \Delta K_i \\ K_d = K_{d0} + \Delta K_d \end{cases},$$

Among them, $K_{p0}$, $K_{i0}$ and $K_{d0}$ are initial PID control parameters, and the initial parameters of the PID controller can be set by the critical proportional method.

After the timely adjustment of the control parameters is completed, the PID controller 123 can acquire the displacement deviation e output by the calculator 124, and outputs the image distance control signal for controlling the action of the execution component to change the displacement of the HUD image source.

In this embodiment, the fuzzy PID control can be used to generate the image distance control signal and the angle control signal; wherein the fuzzy control and the PID control can then be combined to complement each other. In some such embodiments, the fuzzy controller can then be utilized to adjust the control parameters of the PID controller in real-time to realize the self-adaptive adjustment of PID parameters.

Self-adaptive adjustment can improve the accuracy and robustness of image source displacement control, and avoid the problem of static difference when using fuzzy controller alone.

Figure 6:
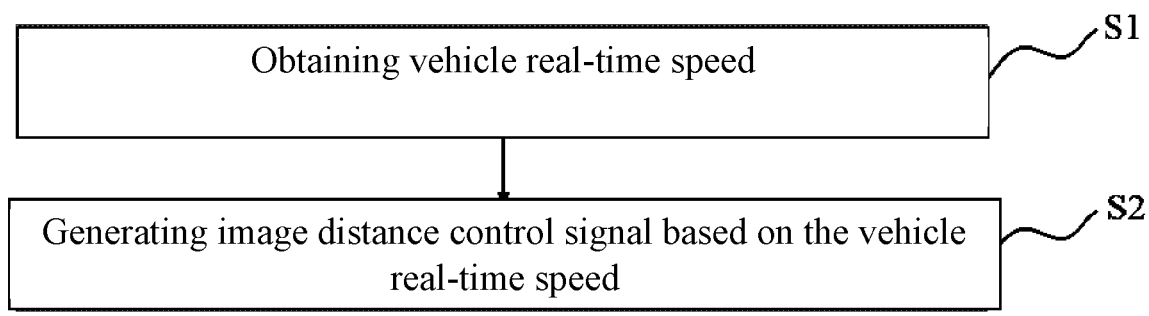
FIG. 6 illustrates an exemplary flowchart of a driving method of a heads-up display device according to some embodiments of the present disclosure.

According to some additional aspects of the present disclosure, there can also be further provided a driving method for the head up display system described in any of the above embodiments. As shown in FIG. 6, which illustrates a flow chart of a driving method for a heads-up display system according to an embodiment of the present disclosure, which can include the following steps:

S1, obtaining real-time speed of the vehicle;

S2. Generating an image distance control signal according to the real-time speed of the vehicle, so that the image distance of the image displayed by the heads-up display device changes according to the change of the real-time vehicle speed.

In an optional embodiment, the above driving method can further include the following steps:

S3. Generating an angle control signal in accordance with the real-time speed of the vehicle, the angle control signal containing information to adjust a top view angle of the image displayed by the heads-up display device.

Specifically, in conjunction with step S2, wherein an image distance control signal is generated according to the real-time speed of the vehicle, including the following steps:

S201. Determining an approximate vehicle speed of the real-time speed according to the real-time speed.

S202. Generating an image distance control signal according to the approximate vehicle speed.

Specifically, in conjunction with step S3, generating an angle control signal i in accordance with the real-time speed of the vehicle, which can include the following steps:

S301. Determining an approximate vehicle speed of the real-time speed according to the real-time speed.

S302. Generating an angle control signal according to the approximate vehicle speed.

In some embodiments, in accordance with step S201 and step S301, determining an approximate vehicle speed of the real-time speed according to the real-time speed.

Specifically, the interval in which the obtained real-time vehicle speed is located in the preset plurality of vehicle speed range can be determined, and a preset approximate value corresponding to the vehicle speed interval in which the real-time vehicle speed is located can thus be set as an approximate vehicle speed of the real-time vehicle speed, wherein the plurality of vehicle speed intervals can be a continuous multiple speed range.

According to another aspect of the present disclosure, a non-transitory computer-readable storage medium including instructions stored thereon can be provided. The instructions are executable by processing circuits to implement some of the operations described above.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

According to another aspect of the present disclosure, contemplated herein is a system including a vehicle, which comprises a heads-up display device provided in accordance with one or more embodiments of the present disclosure as discussed above.

According to yet another aspect of the present disclosure, also contemplated herein is an electronic device 400, which implements the method in the second embodiment.

Figure 7:
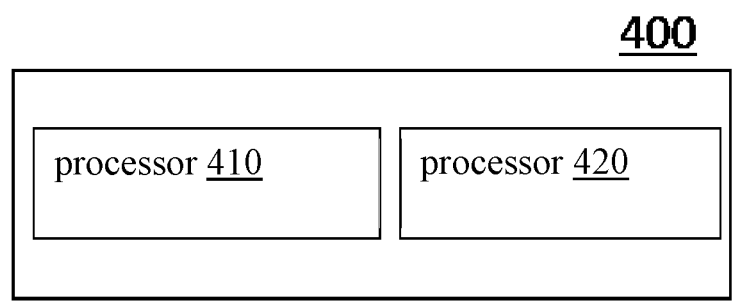
FIG. 7 illustrates a block diagram of an electronic device according to some embodiments of the present disclosure.

As shown in FIG. 7, the electronic device can include one or more processors 410 and a memory 420, wherein the memory can be configured to store computer executable instructions, wherein the computer executable instructions are configured to be executed by one or more processors to perform the methods of any of the embodiments as discussed above.

In various embodiments of the present disclosure, the processor can be implemented by an application specific integrated circuit chip. For example, the application specific integrated circuit chip can be disposed on a motherboard, for example, a memory and a power circuit can be disposed on the motherboard; the processor can also be implemented by circuitry or by software, hardware (circuitry), firmware, or any combination thereof.

In some embodiments of the present disclosure, the processor can include various computing structures, such as a Complex Instruction Set Computer (CISC) structure, a Reduced Instruction Set Computer (RISC) structure, or a structure that implements a combination of multiple instruction sets. In some embodiments, the processor can also be a microprocessor, such as an X86 processor or an ARM processor, or can be a digital signal processing (DSP) or the like.

In some embodiments of the present disclosure, a storage medium can be disposed, for example, on the above-described main board, and the storage medium can hold instructions and/or data executed by the processor. For example, the memory can include one or more computer program products, which can include various forms of computer readable memory, such as volatile memory and/or nonvolatile memory. The volatile memory can include, for example, a random-access memory (RAM) and/or a cache or the like.

The nonvolatile memory can include, for example, a read only memory (ROM), a hard disk, a flash memory, or the like. One or more computer program instructions can be stored on the computer readable memory, and the processor can execute the program instructions to implement a desired function (implemented by a processor) in an embodiment of the present disclosure.

There are a few points to note:

The flowchart and block diagrams in the figures illustrate the architecture, functionality and operation of possible implementations of systems, methods and computer program products in accordance with various embodiments of the disclosure. In this regard, each block in the flowchart or block diagram can represent a module, a program segment, or a portion of code, and a module, a program segment, or a portion of code includes one or more executable instructions configured to realize designed logic functions.

It should also be noted that in some alternative implementations, the functions noted in the blocks can also occur in a different order than that illustrated in the drawings.

For example, two successively represented elements in a flow chart can in fact be executed substantially in parallel, and they can sometimes be executed in the reverse order, depending upon the functionality involved. It is also noted that each block of the block diagrams and/or flowcharts, and combinations of blocks in the block diagrams and/or flowcharts, can be implemented in a dedicated hardware-based system that performs the specified function or operation. Or any one of the method steps can be implemented by a combination of dedicated hardware and computer instructions.

Figure 8:
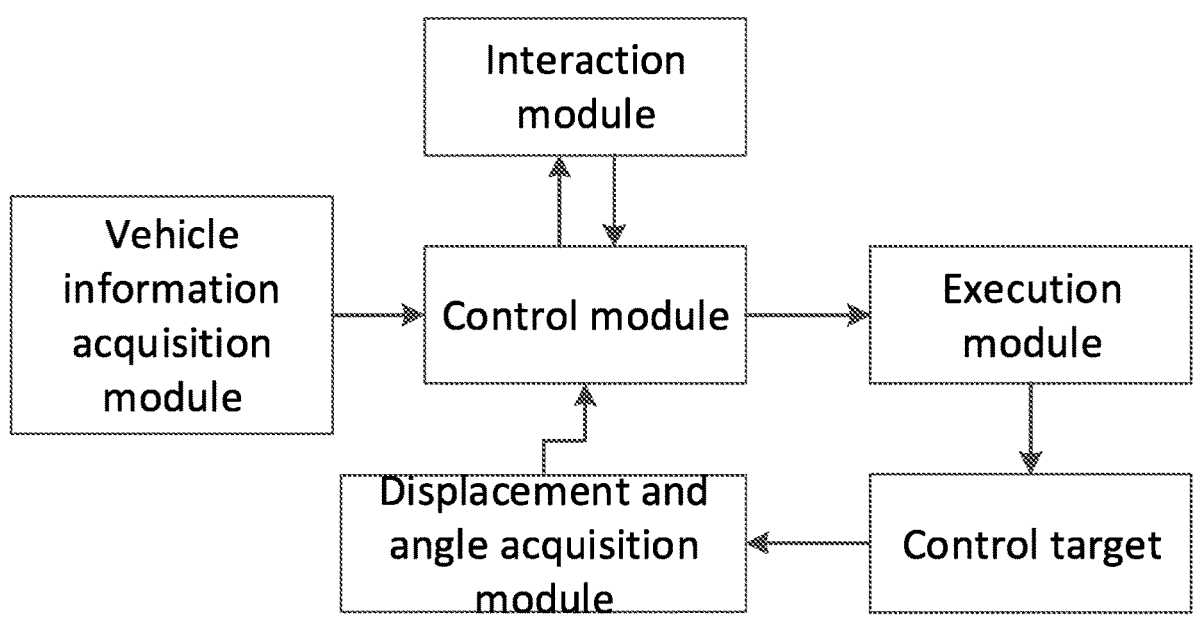
FIG. 8 illustrates an exemplary structural framework illustrating the interactions of various systems capable of implementing the various method steps as contemplated herein.

In some embodiments, the system involved in the present disclosure can also include a plurality of modules, for example six modules as shown in FIG. 8, which are respectively: a vehicle information acquisition module, a control module, an actuator, a controlled object, a displacement and angle acquisition module, and an interaction module.

The vehicle information collecting module can be utilized so as to periodically collect current driving information of the vehicle and transmit the data to the control module.

The control module can operate as the core of the whole system. As contemplated herein, the control module can b e used to preprocess the acquired driving information, realize the control algorithm, output the control signal, and control the action of the actuator.

The actuator can then be utilized to control the controlled object to move up or down according to the control signal sent by the control module. The visual effect of moving the HUD virtual image back and forth can then be achieved by adjusting the displacement of the HUD image source in its normal direction.

Alternatively, a fixed concave lens can be replaced by adding a zoom projection system outside the image source or by using an electrically controllable liquid crystal concave lens. By making this substitution an alternative method can be realized as will be discussed below The technical effects of moving the HUD virtual image up and down can be achieved by adjusting the rotation angle of the concave mirror. Therefore, the controlled object can then include two image sources and concave mirrors respectively for the vehicle HUD. The displacement and angle acquisition module can be utilized so as to collect the displacement of the HUD image source in the up and down direction and the rotation angle of the concave mirror.

With regard to the vehicle information acquisition module, the vehicle information acquisition module can include a CAN bus, CAN receiver, and CAN controller. The OBD interface, which can be located inside the vehicle, can be used to periodically collect the driving information of the vehicle through the CAN bus, and convert the collected driving information into a data frame conforming to the CAN application layer protocol, and transmit the data frame to the control module.

With regard to the control module: this control module can include a SOC and one or more necessary peripherals. The control module can be utilized to preprocess the CAN data frame transmitted from the vehicle information acquisition module, and realize the control of the HUD imaging position, which can include the distance and the top and bottom, according to the vehicle speed. The control module can then parse the data frame(s) transmitted by the vehicle information collection module according to the agreed CAN application layer protocol, extract velocity information therefrom, and map the vehicle speed information to the desired displacement of the imaging source and the desired rotation angle of the mirror.

With regard to a mapping rule, considering that the actual speed of the vehicle changes frequently, a mapping rule can be implemented which can cause the expected displacement of the image source and the rotation angle of the concave mirror to change frequently.

In this manner, the imaging position of the HUD virtual image can be allowed change frequently, which will reduce the driving experience of the driver. In order to avoid this reduced or deteriorating experience to the driver during frequent velocity changes the actual speed of the vehicle can be quantified. If the quantification interval is [Vmin, Vmax], the value of the quantification interval is represented by Vmin, and the quantification interval $\Delta V$ can be determined according to actual needs.

When the current vehicle speed is 0 km/h, the expected displacement de of the HUD image source is equal to the actual displacement d of the image source, which is 0 or d0≠0 cm.

If the current vehicle speed V is within the threshold range, the expected displacement of the HUD image source De can be linear with respect to speed.

If the current vehicle speed V exceeds the threshold range, considering the limited space inside the vehicle, the expected displacement of the HUD image source should be similar to the current vehicle speed V. According to the above rules, the mapping model of the current vehicle speed V and the desired displacement de of the HUD image source can be expressed as:

$$d_e = \begin{cases} \frac{V}{\Delta V} \times k + d_0 & \frac{V}{\Delta V} < \theta \\ \left[\theta + \frac{V - \theta \cdot \Delta V}{\Delta V} \times \log_{2\Delta V}(V - \theta \cdot \Delta V)\right] \times k + d_0 & \frac{V}{\Delta V} \geq \theta \end{cases}$$

Where de is the expected displacement of the HUD image source, k is the conversion coefficient, selected as 0.8, $\Delta V$ is the current vehicle speed V, and the quantification interval is selected as 10, de0 is the initial displacement of the HUD image source, which can be set according to the characteristics of the driver, $\theta$ is the quantized speed threshold, according to the regulations, the maximum speed of the general vehicle when traveling shall not exceed 120 km/h, so θ is selected as θ, and the above parameters can be adjusted within a certain range before the vehicle is sold. The mapping model between the actual displacement d of the HUD image source and the distance L of the HUD virtual image from the driver's eye is as follows:

$$L=100\alpha \cdot d$$

Where α is the scale factor, which can be in the range [1, 2].

When the current vehicle speed is 0 km/h, the expected rotation angle θ of the HUD concave mirror is 0 or r0≠0°, considering that the upper and lower movement range of the virtual image cannot be too large, otherwise it is easy to block the front object, and the current vehicle speed V and HUD concave reflection The mapping model of the expected rotation angle θ of the mirror is:

$$r_e = V/\Delta V \times \beta + r_0$$

The mapping coefficient can then have a value range of [2, 3]. The mapping model typically being between the expected rotation angle θ of the current HUD concave mirror and the virtual image height h is:

$$h = r_e \cdot \delta$$

Where δ is the conversion factor, the range of values is [0.2, 0.3].

The control module can adopt a fuzzy PID control method to realize two controllers, respectively controlling the action of the actuator corresponding to the image source and the action of the actuator corresponding to the concave mirror, thereby realizing the control of the actual displacement of the image source and the rotation angle of the concave mirror.

With regard to the above-mentioned actuator, the actuator can be realized by implementing motor and one or more additional mechanical device, wherein the actuator can be utilized to control the displacement of the HUD image source and the rotation angle of the concave mirror according to the two control signals output by the control module.

With regard to the above mentioned displacement and angle acquisition module, the displacement and angle acquisition module can include a displacement sensor, an angle sensor, and a peripheral circuit, which can include AD, serial port, etc., which can then be used to collect the actual displacement of the HUD image source and the actual rotation angle of the HUD concave mirror, and the actual image source.

The displacement data and the actual rotation angle data of the concave mirror can then be transmitted to the control module through the serial port.

With regard to the above-mentioned interactive module, the interactive module can include a touchable LCD display, which can be used for interaction between the driver and the system. In some embodiments, other types of displays, such as an organic light-emitting diode (OLED) display, may be adopted.

The driver can utilize the display to receive and respond to system prompts, for example, to select whether to automatically adjust the imaging position of the HUD according to the speed of the vehicle through the display. When the automatic adjustment is selected, the automatic setting can also be set.

The mapping model parameters involved in the adjustment, if the driver so happens to choose not to automatically adjust, the driver can then instead manually adjust the imaging position of the HUD to a fixed or alternatively a customized position.

Figure 9:
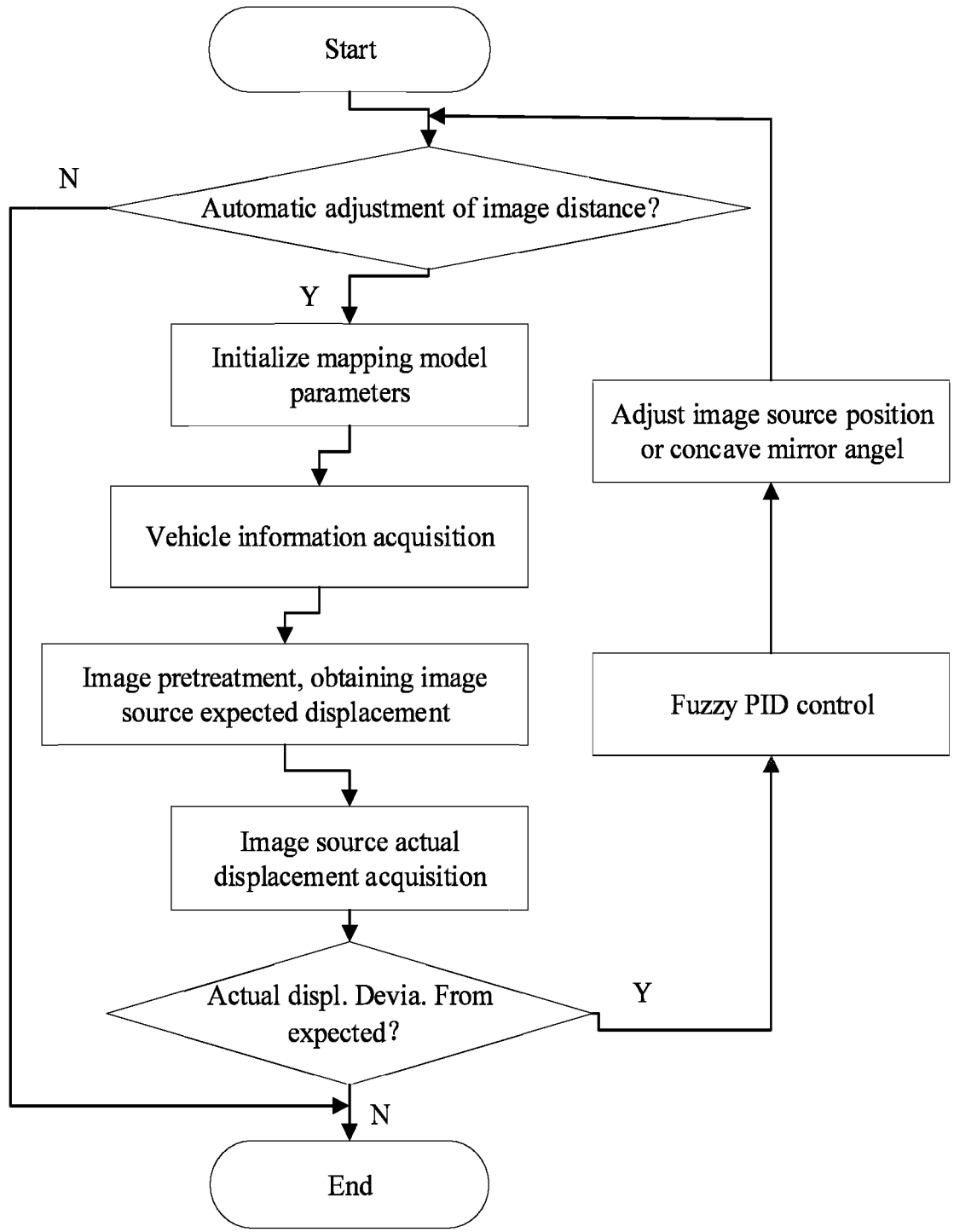
FIG. 9 shows a control flow chart of the vehicle HUD imaging distance adaptive system being illustrative of a method of utilizing the various systems as contemplated herein.

FIG. 9 illustrates a control flow chart of the vehicle HUD imaging distance adaptive system in accordance with various alternative aspects of the present disclosure.

Figure 10:
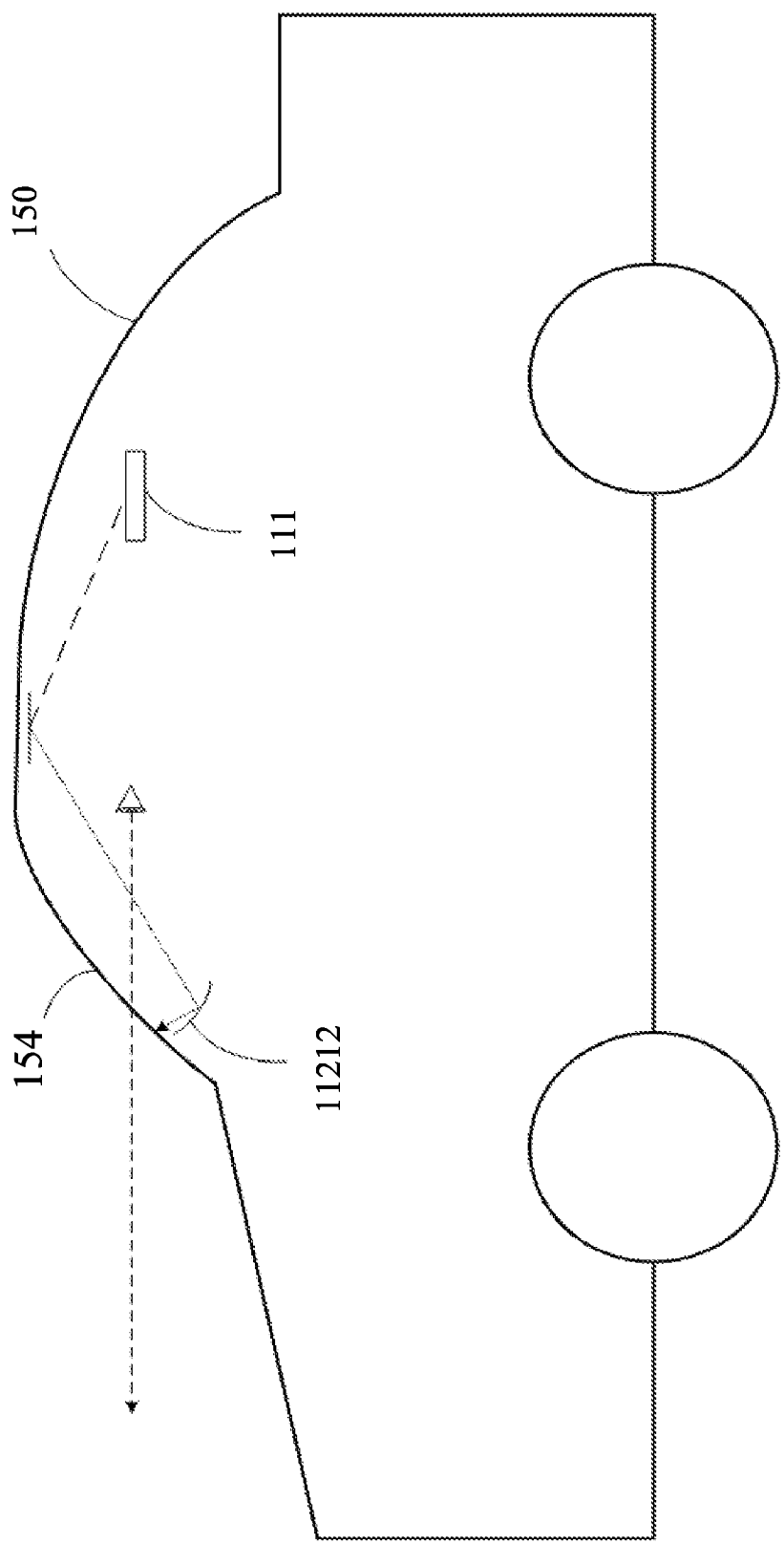
FIG. 10 illustrates an exemplary system schematic in which any of the embodiments of the HUD imaging systems with any one of the various features as discussed herein can be integrated into a vehicle.

FIG. 10 illustrates an exemplary system in which any of the embodiments of the HUD imaging systems with any one of the various features as discussed above can be incorporated into a vehicle 150, wherein the HUD imaging system can project an image onto the vehicles windshield 154.

It will be understood that in some alternative embodiments the HUD image can be directly projected onto the windshield with the HUD focal point coinciding in location with the windshield. Alternatively, the HUD focal point can in some instances utilize the windshield as an additional lens and project an image which would be perceived as a hologram with a focal point being in front of or behind the windshield.

Various embodiments of the present disclosure can have one or more of the following advantages.

Vehicle-mounted HUD intelligent control can be realized. A method and a system for adaptive positioning of a vehicle-mounted HUD image; acquiring a driving information of a vehicle by using a CAN bus, and pre-processing the driving information by using an MCU, extracting vehicle speed information, and extracting Mapped to the expected displacement of the HUD image source and the expected rotation angle of the concave mirror; according to the expected value, the fuzzy PID control method is used to control the actual displacement of the HUD image source and the actual rotation angle of the concave mirror, thereby realizing the HUD imaging position based on the vehicle speed.

The on-board HUD imaging position adaptive system provided by various embodiments of the present disclosure can also solves one or more problems of the existing HUD technologies. For example, a conventional HUD cannot adjust the imaging position when the vehicle speed changes, and the driver's driving experience is deteriorated, and the driving safety level is lowered.

As such, in the heads-up display device, the driving method, and the technical solution of the vehicle provided by various embodiments the present disclosure, the image distance and the overhead angle of the image can be adjusted according to the vehicle speed adjustment, and the time needed for the driver to switch between the normal driving and the viewing of the displayed image of the heads-up display device is reduced. This can greatly reduce the chance of accidents.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

Dividing the device into different "regions," "units," or "layers," etc. merely reflect various logical functions according to some embodiments, and actual implementations can have other divisions of "regions," "units," or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A heads-up display device for a vehicle, comprising:
a display component;
a controller; and
an execution component;
wherein:
   the display component is configured to output a heads-up display image;
   the controller is configured to acquire a real-time vehicle speed of the vehicle, and generate an image distance control signal associated with the real-time vehicle speed of the vehicle; and
   the execution component is connected to the display component, and the execution component is configured to adjust a focal point of the display component according to the image distance control signal, and control an image distance of the heads-up display image displayed by the display component thus adjusting the focal point of the display component according to the change of the real-time vehicle speed;
   wherein the controller is configured to determine an approximate vehicle speed of the real-time vehicle speed according to the real-time vehicle speed and generate an image distance control signal according to the approximate vehicle speed;
   the controller further comprises a storage module;
   the storage module is configured to store a preset plurality of vehicle speed intervals, each interval corresponding to a different preset approximation, wherein the plurality of vehicle speed intervals are consecutive multiple vehicle speed intervals;
   the controller is configured to determine which of the plurality of vehicle speed ranges in which the acquired real-time vehicle speed is located, and use a preset approximate value corresponding to the vehicle speed interval in which the current real-time vehicle speed is located as the approximate vehicle speed of the real-time vehicle speed;
   the display component comprises an image source having an adjustable position;
   the controller is further configured to calculate an expected displacement of the image source according to the approximate vehicle speed, and generate an image distance control signal according to the expected displacement; and wherein the execution component includes a first actuator coupled to the positionally adjustable image source;
the first actuator is configured to control the image source to move at least in a first direction in accordance with an image distance control signal generated by the controller;
the first direction is a light exiting direction of the image source;
the plurality of the vehicle speed intervals has a fixed quantification interval; and wherein the controller determines an expected displacement of the image source by using a first algorithm;
the first algorithm comprises:

$$L_e = \begin{cases} \frac{Va}{\Delta V} \times k + L_0, & \frac{Va}{\Delta V} < \theta \\ \left[\theta + \frac{Va - \theta \cdot \Delta V}{\Delta V} \times \log_{2\Delta V}(Va - \theta \cdot \Delta V)\right] \times k + L_0, & \frac{Va}{\Delta V} \geq \theta \end{cases};$$

and
Le is the expected displacement of the image source, k is the conversion coefficient, $\Delta V$ is the fixed quantification interval of the current vehicle speed V, $\theta$ is the quantized speed threshold, and L0 is the initial displacement.

2. The heads-up display device according to claim 1, wherein:
the controller is further configured to generate an angle control signal according to a real-time vehicle speed of the vehicle; and
the execution component is further configured to drive the display component to adjust a top view angle of an image displayed by the display component according to the angle control signal.

3. The heads-up display device according to claim 2, wherein:
the controller is configured to determine an approximate vehicle speed of the real-time vehicle speed according to the real-time vehicle speed; and
the controller is configured to generate an angle control signal according to the approximate vehicle speed.

4. The heads-up display device according to claim 2, wherein the execution component is further configured to:
drive the display component according to the angle control signal; and
control the distance between an image displayed by the component and the plane that the vehicle is located to be at the preset distance.

5. The heads-up display device of claim 2, wherein the display component comprises:
an optical module configured to receive the lights from an image source and emit an image;
wherein:
the optical module includes a first mirror that is rotatable about an axis;
the controller is further configured to calculate an expected rotation angle of the first mirror according to the real-time vehicle speed, and generate an angle control signal according to the expected rotation angle; and
the execution component includes a second drive assembly coupled to the first mirror, which configured to control the rotation of the first mirror by the angle control signal generated by the controller.

6. The heads-up display device according to claim 1, wherein a relative distance between a natural gaze focal point of a driver and the HUD focal point have a customizable rate of convergence or divergence, the customizable rate of convergence or divergence being dependent in part on the actual velocity of the vehicle.

7. A vehicle comprising the heads-up display device according to claim 1.

8. A driving method for a heads-up display (HUD) device, comprising:
displaying a HUD display image;
determining a real-time speed of the vehicle;
generating an image distance control signal according to a real-time speed of the vehicle such that an image distance of an image displayed by the heads-up display device changes according to a change in the real-time vehicle speed;
adjusting a focal point of the HUD display image according to the image distance control signal according to the change of the real-time vehicle speed;
storing a preset plurality of vehicle speed intervals, each interval corresponding to a different preset approximation, wherein the plurality of vehicle speed intervals are consecutive multiple vehicle speed intervals;
determining which of the plurality of vehicle speed ranges in which the acquired real-time vehicle speed is located, and use a preset approximate value corresponding to the vehicle speed interval in which the current real-time vehicle speed is located as the approximate vehicle speed of the real-time vehicle speed, wherein the plurality of the vehicle speed intervals has a fixed quantification interval; and
determining an expected displacement of the image source by using a first algorithm comprising:

$$L_e = \begin{cases} \frac{Va}{\Delta V} \times k + L_0, & \frac{Va}{\Delta V} < \theta \\ \left[\theta + \frac{Va - \theta \cdot \Delta V}{\Delta V} \times \log_{2\Delta V}(Va - \theta \cdot \Delta V)\right] \times k + L_0, & \frac{Va}{\Delta V} \geq \theta \end{cases};$$

wherein:
Le is the expected displacement of the image source, k is the conversion coefficient, $\Delta V$ is the fixed quantification interval of the current vehicle speed V, $\theta$ is the quantized speed threshold, and L0 is the initial displacement; and
a relative distance between a natural gaze focal point of a driver and the HUD focal point have a customizable rate of convergence or divergence, the customizable rate of convergence or divergence being dependent in part on the actual velocity of the vehicle.

9. The driving method according to claim 8, further comprising:
generating an angle control signal based on the real-time vehicle speed of the vehicle so as to adjust a top view angle of the HUD display image being displayed by the heads-up display device.

10. The driving method according to claim 8, further comprising
generating an image distance control signal according to the real-time speed of the vehicle based on:
determining an approximate vehicle speed of the real-time speed according to a real-time speed interval range; and generating an image distance control signal based on the approximate vehicle speed.

11. The driving method according to claim 9, the generating an angle control signal according to the real-time vehicle speed of the vehicle comprising:
determining an approximate vehicle speed of the real-time speed according to the real-time speed; and
generating an angle control signal based on the approximate vehicle speed.

12. The driving method according to claim 10, wherein:
the interval of the preset plurality of vehicle speed ranges in which the real-time vehicle speed is located is determined;
an approximate vehicle speed of the real-time vehicle speed is determined by using the preset approximate value corresponding to the vehicle speed interval in which the real-time vehicle speed is located; and
the plurality of vehicle speed ranges is composed of continuous multiple speed intervals.

13. A heads-up display device for a vehicle, comprising:
a display component;
a controller; and
an execution component;
wherein:
the display component is configured to output a heads-up display image;
the controller is configured to acquire a real-time vehicle speed of the vehicle, and generate an image distance control signal associated with the real-time vehicle speed of the vehicle;
the execution component is connected to the display component;
the execution component is configured to adjust a focal point of the display component according to the image distance control signal, and control an image distance of the heads-up display image displayed by the display component thus adjusting the focal point of the display component according to the change of the real-time vehicle speed;
the controller is further configured to generate an angle control signal according to a real-time vehicle speed of the vehicle;
the execution component is further configured to drive the display component to adjust a top view angle of an image displayed by the display component according to the angle control signal;
the controller is configured to determine an approximate vehicle speed of the real-time vehicle speed according to the real-time vehicle speed and generate an image distance control signal according to the approximate vehicle speed;
the controller is further configured to generate an angle control signal according to the approximate vehicle speed; and
the execution component is further configured to drive the display component according to the angle control signal, and to control the distance between an image displayed by the component and the plane that the vehicle is located to be at the preset distance;
the controller further comprises a storage module;
the storage module is configured to store a preset plurality of vehicle speed intervals, each interval corresponding to a different preset approximation;
the plurality of vehicle speed intervals are consecutive multiple vehicle speed intervals; and
the controller is configured to determine which of the plurality of vehicle speed ranges in which the acquired real-time vehicle speed is located, and use a preset approximate value corresponding to the vehicle speed interval in which the current real-time vehicle speed is located as the approximate vehicle speed of the real-time vehicle speed;
the plurality of the vehicle speed intervals has a fixed quantification interval;
the controller determines an expected displacement of the image source by using a first algorithm comprising:

$$L_e = \begin{cases} Va/\Delta V \times k + L_0, & Va/\Delta V < \theta \\ [\theta + (Va - \theta \cdot \Delta V)/\Delta V \times \log_{2\Delta V}(Va - \theta \cdot \Delta V)] \times k + L_0, & Va/\Delta V \geq \theta \end{cases};$$

Le is the expected displacement of the image source, k is the conversion coefficient, $\Delta V$ is the fixed quantification interval of the current vehicle speed V, $\theta$ is the quantized speed threshold, and L0 is the initial displacement; and
a relative distance between a natural gaze focal point of a driver and the HUD focal point have a customizable rate of convergence or divergence, the customizable rate of convergence or divergence being dependent in part on the actual velocity of the vehicle.

14. The heads-up display device according to claim 13, wherein:
the display component comprises an image source having an adjustable position, and wherein the controller is further configured to calculate an expected displacement of the image source according to the approximate vehicle speed, and generate an image distance control signal according to the expected displacement;
the execution component includes a first actuator coupled to the positionally adjustable image source;
the first actuator is configured to control the image source to move at least in a first direction in accordance with an image distance control signal generated by the controller; and
the first direction is a light exiting direction of the image source.

* * * * *